US012565563B2

(12) United States Patent
Kong et al.

(10) Patent No.: US 12,565,563 B2
(45) Date of Patent: Mar. 3, 2026

(54) HALOGEN-FREE SYNERGIST

(71) Applicant: Agency for Science, Technology and Research, Singapore (SG)

(72) Inventors: Junhua Kong, Singapore (SG); Songlin Liu, Singapore (SG); Suxi Wang, Singapore (SG); Qi Feng Lim, Singapore (SG); Beng Hoon Maureen Janet Tan, Singapore (SG); Chaobin He, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 498 days.

(21) Appl. No.: 18/018,949

(22) PCT Filed: Aug. 10, 2021

(86) PCT No.: PCT/SG2021/050466

§ 371 (c)(1),
(2) Date: Jan. 31, 2023

(87) PCT Pub. No.: WO2022/035377

PCT Pub. Date: Feb. 17, 2022

(65) Prior Publication Data

US 2023/0295376 A1 Sep. 21, 2023

(30) Foreign Application Priority Data

Aug. 12, 2020 (SG) ........................... 10202007720X

(51) Int. Cl.

*C08G 73/06* (2006.01)
*C08K 3/32* (2006.01)
*C08L 23/12* (2006.01)

(52) U.S. Cl.

CPC .............. *C08G 73/065* (2013.01); *C08K 3/32* (2013.01); *C08L 23/12* (2013.01); *C08K 2003/323* (2013.01); *C08L 2201/02* (2013.01)

(58) Field of Classification Search

None
See application file for complete search history.

(56) References Cited

U.S. PATENT DOCUMENTS

| | | | | |
|---|---|---|---|---|
| 5,534,291 A * | 7/1996 | Fukumura | C08K 9/04 427/255.6 |
| 2007/0185248 A1* | 8/2007 | Qian | C08L 23/02 524/502 |

FOREIGN PATENT DOCUMENTS

| | | | | |
|---|---|---|---|---|
| CN | 101613374 A | 12/2009 | |
| CN | 102492171 A | 6/2012 | |
| CN | 104193953 A * | 12/2014 | C08G 18/7671 |
| CN | 106832259 A * | 6/2017 | C08G 65/48 |
| CN | 110387042 A * | 10/2019 | C08G 79/02 |
| CN | 110527100 A * | 12/2019 | C08L 55/02 |

OTHER PUBLICATIONS

Cn110527100, English machine translation, prepared Jul. 25, 2025. (Year: 2025).*
Cn104193953, English machine translation, prepared Jul. 25, 2025 (Year: 2025).*
Cn106832259, English machine translation, prepared Jul. 25, 2025 (Year: 2025).*
Cn-110387042, English machine translation, prepared Jul. 25, 2025 (Year: 2025).*
Li et al., "Synthesis of a Novel Self-Intumescent Flame Retardant with Spiro and Triazine Structure and its Performance for Polypropylene," Journal of Fire Sciences, vol. 34, No. 2, Dec. 23, 2015, pp. 104-119.
Xiao et al., "Preparation, Fire Behavior and Thermal Stability of a Novel Flame Retardant Polypropylene System," Journal of Thermal Analysis and Calorimetry, vol. 125, Feb. 26, 2016, pp. 321-329.
Xu et al., "Flame Retardant Mechanism of an Efficient Flame-Retardant Polymeric Synergist with Ammonium Polyphosphate for Polypropylene," Polymer Degradation and Stability, vol. 98, 2013, pp. 2011-2020.
Wang et al., "Synthesis of a Novel Charring Agent Containing Pentaerythritol and Triazine Structure and its Intumescent Flame Retardant Performance for Polypropylene, " Polymer Degradation and Stability, vol. 144, 2017, pp. 454-463.
Xie et al., "Novel Phosphorous-Nitrogen Containing Poly(aryl ether ketone)s: Synthesis, Characterization, and Thermal Properties," Designed Monomers and Polymers, vol. 16, No. 1, Jan. 2013, pp. 38-46.
Seidi et al., "Flame Retardant Polypropylenes: A Review," Polymers, vol. 12, No. 1701, Jul. 29, 2020, pp. 1-49.
International Search Report for International Application No. PCT/SG2021/050466 dated Nov. 2, 2021, pp. 1-5.
Written Opinion of the International Searching Authority for International Application No. PCT/SG2021/050466 dated Nov. 2, 2021, pp. 1-5.

* cited by examiner

*Primary Examiner* — Christopher M Rodd
(74) *Attorney, Agent, or Firm* — Shackelford, McKinley & Norton, LLP

(57) ABSTRACT

A polymer having a backbone and a side unit of 9,10-dihydro-9-oxa-10-phosphaphenanthrene 10-oxide bonded thereto, where the backbone of the polymer includes at least one heterocyclic moiety. There is also provided a process for producing the polymer as defined herein as well as a flame retardant polyolefin formulation including the polymer as defined herein and a moulded article including the flame retardant polyolefin formulation as defined herein.

18 Claims, 6 Drawing Sheets

HALOGEN-FREE SYNERGIST

CROSS-REFERENCE TO RELATED APPLICATION

This application claims the benefit of priority of Singapore Patent Application No. 10202007720X, filed 12 Aug. 2020, the contents of it being hereby incorporated by reference in its entirety for all purposes.

TECHNICAL FIELD

Various aspects of this disclosure relate to a polymer as a halogen-free synergist with flame retardant properties. Various aspects of this disclosure also relate to a process for producing the polymer and a flame retardant polyolefin formulation comprising the polymer.

BACKGROUND

Polyolefins are a family of polymers synthesized from simple olefin monomers. The two major members in the polyolefin family, polypropylene (PP) and polyethylene (PE), account for more than 55% of all synthetic polymers produced worldwide due to their unique combination of cost, properties and ease of processing. However, polyolefins generally exhibit extremely high flammability due to their aliphatic hydrocarbon structures. To upgrade polyolefins for engineering applications, it is imperative to improve their flame retardant properties.

The flame retardancy for polyolefins is very demanding as polyolefins decompose into small and volatile hydrocarbons upon pyrolysis. Polyolefins burn without residues, and exhibit the lowest LOI (limiting oxygen index) and the highest HRR (heat release rate) among the various synthetic polymers. In the past, most effective flame retardants for polyolefins were halogen-based. However, with the increasing regulatory requirements on safety and the environment, halogen-based flame retardants are gradually being replaced with non-halogenated flame retardants.

On the other hand, inorganic metal hydroxides, mainly aluminum hydroxide (ATH) and magnesium hydroxide (MDH), are the largest class of flame retardants by volume, yet, a high loading of 60 wt % is required.

Phosphorus-based flame retardants volatilize into the gas phase where they act as potent radicals scavenger. However, phosphorus-based flame retardants are believed to be inefficient in polyolefins, unless they provide significant gas phase efficiency or are combined with charring agents to form intumescent systems. The dominant phosphorous-based flame retardant for polyolefins is ammonium polyphosphate (APP).

Nitrogen-based flame retardants are from either ammonia or melamine. The primary mode of action is endothermic decomposition, which releases large amounts of non-flammable gaseous ammonium and nitrogen compounds. The development of efficient synergists and their formulation into flame retardant polyolefin formulations is still to be explored.

Therefore, there remains a need to provide improved materials for use as a flame retardant synergist. There also remains a need to provide improved methods for the production of the improved materials and improved flame retardant polyolefin formulations.

SUMMARY

In a first aspect, there is provided a polymer having a backbone and a side unit of 9,10-dihydro-9-oxa-10-phosphaphenanthrene 10-oxide bonded thereto, wherein the backbone of the polymer comprises at least one heterocyclic moiety.

In a second aspect, there is provided a process for producing the polymer as described above, comprising bonding 9,10-dihydro-9-oxa-10-phosphaphenanthrene 10-oxide to a monomeric unit to obtain a polymerisation precursor; polymerize the polymerisation precursor with at least one heterocyclic unit, wherein the backbone of the polymer is formed by the reaction product of the monomeric unit and the at least one heterocyclic unit; and obtaining the polymer as described above by precipitation.

In a third aspect, there is provided a flame retardant polyolefin formulation comprising the polymer as described above, a polyolefin matrix and an inorganic flame retardant.

In a fourth aspect, there is provided a moulded article comprising the flame retardant polyolefin formulation as described above.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
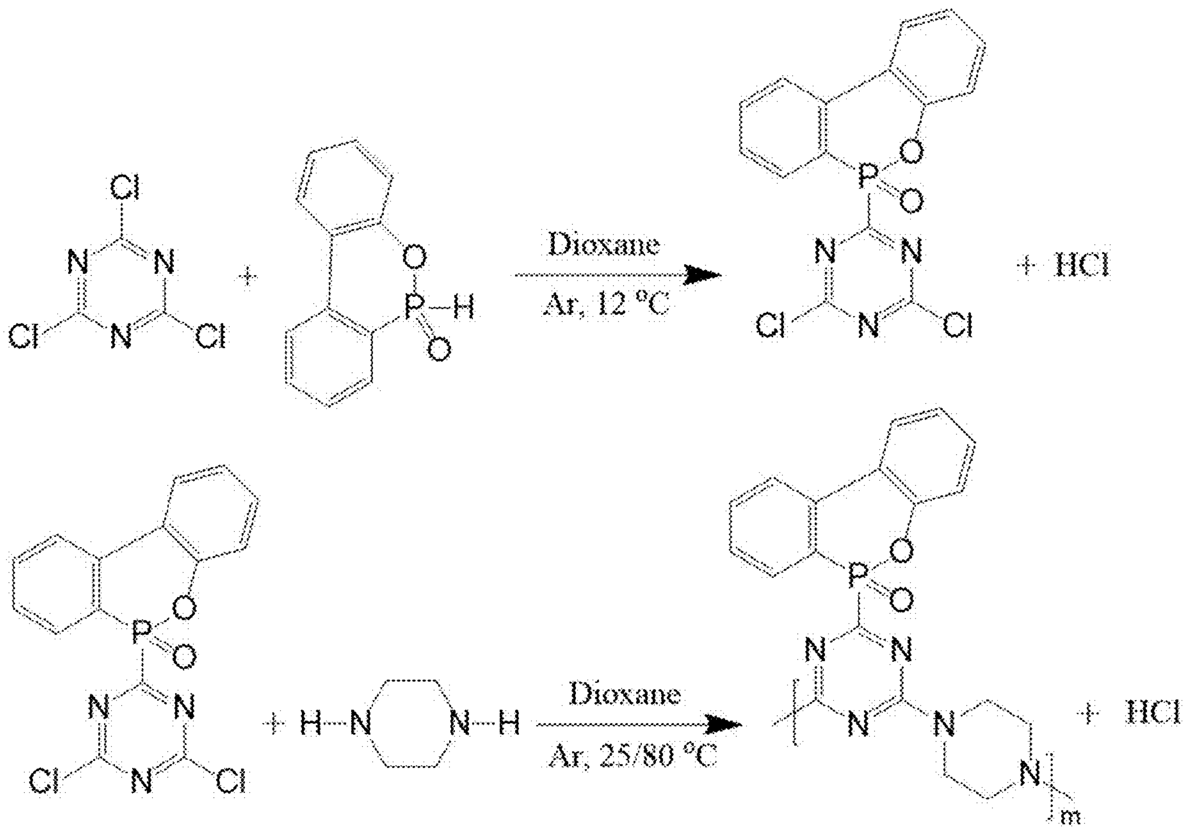
FIG. 1 shows the synthesis strategy of synergist 1 (Sng1)

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

In a first aspect, the present disclosure provides a polymer having a backbone and a side unit of 9,10-dihydro-9-oxa-10-phosphaphenanthrene 10-oxide (DOPO) bonded thereto. The backbone of the polymer comprises at least one heterocyclic moiety. The polymer described herein represents a flame retardant synergist material. Advantageously, the polymer structure provides the synergist with thermal stability and structural integrity. Moreover, since DOPO moieties are chemically linked with the backbone of the polymer, thermal stability of the synergist is even improved. Moreover, DOPO and the heterocyclic moiety of the backbone of the polymer provide oxidation resistance to the synergist. Even more advantageously, the polymer according to the present disclosure is substantially free of halogen atoms, which enhances the safety and the environment aspects of the synergist.

Advantageously, the synergist of this disclosure can be combined with other flame retardant agents for a flame retardant polyolefin formulation according to a third aspect in this disclosure. Without being limited to theory, it is hypothesized that the rich amount of heteroatoms, in particular nitrogen and phosphorus, in the developed synergists helps to balance the flame retardant properties and the synergist loading within the flame retardant polyolefin formulation. In other words, good flame retardant properties at relatively low synergist loading have been achieved. This offers the opportunity to reduce the cost while balancing the flame retardant properties and the mechanical properties of the flame retardant polyolefin formulations. On the other hand, at a higher synergist loading (for example, 20 wt % and above), the synergist of this disclosure advantageously leads to almost instant extinction (e.g., in less than 1 second upon removal of burner).

In this disclosure, there is disclosed a polymer having a backbone and a side unit. The monomeric unit of the polymer that forms the backbone of the polymer may comprise cyclic moieties, for example a heterocyclic moiety. In particular, the at least one heterocyclic moiety may be present in the backbone of each repeating unit of the polymer. In some embodiments, at least two heterocyclic moieties may be present in the backbone of the polymer. “Backbone” of the polymer, as used herein, refers to a moiety within the polymer, for which it is possible to draw an imaginary line from one monomeric unit to the next, using the covalent bonds connecting the atoms that are part of that moiety without having to use a covalent bond twice (i.e. back and forth). This is in contrast with a side unit, which, as used herein, refers to a moiety that is connected to a monomeric unit with a single bond. An imaginary line from one monomeric unit to the next through the covalent bonds of that unit would have to pass through that single bond twice (i.e. back and forth), hence distinguishing the side unit from the backbone of the polymer.

“Heterocyclic”, as used herein, refers to saturated, partially unsaturated or fully unsaturated monocyclic, bicyclic or polycyclic ring system containing at least one heteroatom selected from the group consisting of nitrogen, sulphur and oxygen as a ring atom. Examples of heterocyclic moieties include heterocycloalkyl, heterocycloalkenyl and heteroaryl.

According to various embodiments, at least one heteroatom of the at least one heterocyclic moiety may be selected from a group 15 element of the periodic table. Advantageously, a higher number of group 15 elements of the periodic table within the synergist may help to enhance the flame retardant properties of the synergist. Accordingly, the polymer may comprise at least 2, optionally at least 4, optionally at least 5 heteroatoms selected from the group 15 element of the periodic table in each repeating unit of the polymer.

According to various embodiments, the at least one heteroatom of the at least one heterocyclic moiety may be selected from a non-metal element, e.g., nitrogen and/or phosphorous.

According to various embodiments, a heterocyclic ring of the at least one heterocyclic moiety may have at least 2 carbon atoms, or at least 3 carbon atoms.

According to various embodiments, the at least one heterocyclic moiety may comprise a 4- to 7-membered ring, optionally a 5- or 6-membered ring, in particular a 6-membered ring.

According to various embodiments, the DOPO may be bonded to each backbone of each repeating unit of the polymer. The bond may be a covalent bond at a phosphorous atom of the DOPO.

According to various embodiments, the at least one heteroatom of the at least one heterocyclic moiety may be nitrogen. Alternatively, the at least one heteroatom of the at least one heterocyclic moiety may be phosphorous.

According to various embodiments, the at least one heterocyclic moiety may be selected from one or more of the group consisting of piperidinyl, pyridinyl, phosphaninyl, phosphininyl, diazinanyl, diazinyl, morpholinyl, oxazinyl, thiomorpholinyl, thiazinyl, triazinanyl, triazinyl, tetrazinyl, pentazinyl, cyclic 1,3-propanediol phosphoryl, and a combination thereof.

According to various embodiments, the diazinanyl may be selected from the group consisting of 1,2-diazinanyl, 1,3-diazinanyl, 1,4-diazinanyl (piperazinyl), and a combination thereof.

According to various embodiments, the triazinyl may be selected from the group consisting of 1,2,3-triazinyl, 1,2,4-triazinyl, 1,3,5-triazinyl, and a combination thereof.

According to various embodiments, the at least one heterocyclic moiety may be at least 2 heterocyclic moieties.

According to various embodiments, the at least 2 heterocyclic moieties may comprise triazinyl and diazinanyl. Alternatively, the at least 2 heterocyclic moieties may comprise two moieties of cyclic 1,3-propanediol phosphoryl, which are connected via a spiro center to collectively form spirocyclic pentaerythritol bisphosphoryl.

According to various embodiments, the polymer may have two DOPO bonded to the backbone.

According to various embodiments, the polymer may have the formula (I)

(I)

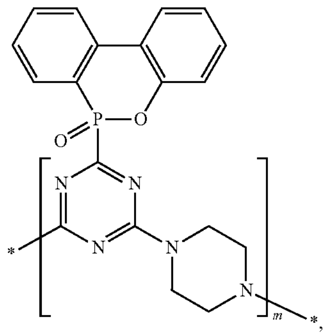

wherein m may be an integer number ranging from 2 to 5000; and

* may represent an attachment point.

The integer m may be in the range of about 3 to about 4000, or in the range of about 4 to about 3000, or in the range of about 5 to about 2000, or in the range of about 10 to about 1500. The range of the integer m may have an influence on the flame retardant and mechanical reinforcement capabilities and the processability. For example, at a higher range of the integer m, the polymer may provide better flame retardant properties and may have better mechanical reinforcement capabilities. On the other hand, at a lower range of the integer m, the polymer may have an improved processability which may result in improved dispersion of the polymer in the flame retardant polyolefin formulation. Accordingly, a range for the integer m being about 10 to about 1500 may be advantageous since it combines the benefits of high flame retardant and mechanical reinforcement capabilities, while ensuring a high processability for improved dispersion in the flame retardant polyolefin formulation.

According to various embodiments, the polymer may have the formula (II)

(II)

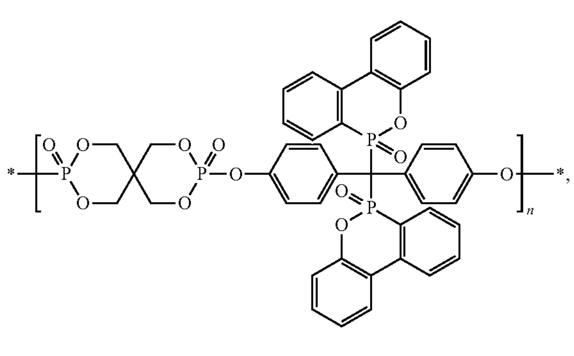

wherein n may be an integer number ranging from 2 to 1000; and

* may represent an attachment point.

The integer n may be in the range of about 2 to about 800, or to about 600, or to about 500, or to about 450. The range of the integer n may have an influence on the flame retardant and mechanical reinforcement capabilities and the processability. For example, at a higher range of the integer n, the polymer may provide better flame retardant properties and may have better mechanical reinforcement capabilities. On the other hand, at a lower range of the integer n, the polymer may have an improved processability which may result in improved dispersion of the polymer in the flame retardant polyolefin formulation. Accordingly, a range for the integer n being about 2 to about 450 may be advantageous since it combines the benefits of high flame retardant and mechanical reinforcement capabilities, while ensuring a high processability for improved dispersion in the flame retardant polyolefin formulation.

According to various embodiments, the polymer may be in a form of a dry powder. Advantageously, by being in a form of a dry powder, the production of the flame retardant polyolefin formulation may be facilitated.

In a second aspect, there is provided a process for producing the polymer as described above. The process comprises the step of bonding DOPO to a monomeric unit to obtain a polymerisation precursor. The process comprises the step of polymerizing the polymerisation precursor with at least one heterocyclic unit. The backbone of the polymer is formed by the reaction product of the monomeric unit and the at least one heterocyclic unit. Subsequently, the polymer as described above is obtained by precipitation.

According to various embodiments, bonding DOPO to the monomeric unit may comprise heating a mixture of two molecules of DOPO with a monomeric unit at a temperature of 160° C. to 190° C.

By "heating" is meant that the temperature of the mixture of DOPO and the monomeric unit is deliberately raised such that a substitution reaction can take place. Heating may thus involve to raise the temperature above room temperature. "Room temperature", as used herein, refers to a temperature greater than 4° C., preferably being in the range from 15° C. to 40° C., or in the range from 15° C. to 30° C., or in the range from 20° C. to 30° C., or in the range from 15° C. to 24° C., or in the range from 16° C. to 21° C., or around 25° C. Such temperatures may include, 14° C., 15° C., 16° C., 17° C., 18° C., 19° C., 20° C., 21° C., and 25° C., each of these values including ±0.5° C.

According to various embodiments, bonding DOPO to the monomeric unit comprises heating the mixture of the two molecules of DOPO with the monomeric unit for about between 1 and 3 hours.

According to various embodiments, the polymerisation precursor may be obtained by precipitation.

In a third aspect, there is provided a flame retardant polyolefin formulation comprising the polymer as described above, a polyolefin matrix and an inorganic flame retardant. Advantageously, the flame retardant polyolefin formulation combines different flame retardation mechanisms from the combination of the polymer as described above and an inorganic flame retardant to achieve the improved flame resistance performance.

The term "formulation" as used herein refers to a mixture of components. Comprised in this formulation may be a polymer as described herein, a polyolefin and an inorganic flame retardant. The polyolefin may be the biggest percentage of the formulation by weight. The polyolefin within the formulation may thus be understood as a "polyolefin matrix". The formulation may be such that there is no covalent bond formation between the components of the formulation. Hence, there would be no covalent bond formation between the polyolefin, the polymer as described herein and the inorganic flame retardant. However, this definition does not preclude any ionic interaction between the polyolefin, the polymer as described herein and the inorganic flame retardant. The association between the polyolefin, the polymer as described herein and the inorganic flame retardant may be an attractive interaction between the components that does not involve sharing of electrons, while resulting in adherence of the materials. For example, such non-covalent interaction may include hydrophobic interaction, hydrophilic interaction, ionic interaction, hydrogen bonding, and/or van der Waals interaction.

According to various embodiments, the polyolefin matrix may comprise a polyolefin selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof, optionally from a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer.

According to various embodiments, the polyolefin matrix may comprise polypropylene.

According to various embodiments, the polyolefin matrix may be present in a weight percentage range of about 20 wt % to about 90 wt %, or of about 30 wt % to about 90 wt %, or of about 40 wt % to about 85 wt %, or of about 50 wt % to about 80 wt %, or of about 60 wt % to about 82 wt %, based on the total weight of the flame retardant polyolefin formulation.

According to various embodiments, the polyolefin matrix may further comprise polypropylene having an anhydride grafted thereon.

According to various embodiments, the polyolefin may be blended with the polypropylene having the anhydride grafted thereon in a weight ratio of about 80:20 to about 99:1, or of about 90:10 to about 95:5, or of about 96:4 to about 99:1, based on the total weight of the polyolefin matrix. Advantageously, a weight ratio of about 90:10 to about 96:4 may be beneficial for achieving high compatibility, and more particular the weight ratio of about 95:5.

According to various embodiments, an anhydride of the polypropylene having the anhydride grafted thereon may be an anhydride selected from the group consisting of maleic anhydride, succinic anhydride, citraconic anhydride, endo-bi-cyclo[2,2,1]-1,4,5,6,7,7-hexa-chloro-5 heptene-2,3-dicarboxylic acid anhydride, endo-bi-cyclo[2,2,1]-5-heptene-2,3-dicarboxylic acid anhydride, cis-4-cyclohexene-1,2-dicarboxylic acid anhydride, and a combination thereof.

According to various embodiments, the anhydride may be maleic anhydride.

According to various embodiments, the inorganic flame retardant may be coated with a nitrogen-containing heterocyclic compound. Advantageously, when coating a nitrogen-containing heterocyclic compound on the inorganic flame retardant of the flame retardant polyolefin formulation, this has the effect of combining the different flame retardation mechanisms with yet another flame retardation mechanism to achieve the improved flame resistance performance.

According to various embodiments, the nitrogen-containing heterocyclic compound may be melamine.

According to various embodiments, the inorganic flame retardant may be a polymeric salt. The inorganic flame retardant may comprise polyphosphate. The inorganic flame retardant may further comprise ammonium. In one example, the inorganic flame retardant may be ammonium polyphosphate.

According to various embodiments, the polymer as described above may be blended with the inorganic flame retardant in a weight ratio of about 1:1 to about 1:10, or of about 1:2 to about 1:8, or of about 1:3 to about 1:6, or of about 1:2 to about 1:4, or of about 1:3 to about 1:4, or of about 1:4 to about 1:5. Advantageously, a weight ratio of the polymer as described above to the inorganic flame retardant of about 1:3 to about 1:4 offers particularly enhanced flame retardant properties.

According to various embodiments, the inorganic flame retardant together with the polymer as described above may be present in the flame retardant polyolefin formulation in about 18 wt % to about 21 wt %, or in about 18 wt % to about 20 wt %, or in about 18 wt % to about 19 wt %, or in about 18 wt %, based on the total weight of the flame retardant polyolefin formulation. Advantageously, at a low loading of about 18 wt % to about 21 wt %, or about 18 wt % to about 20 wt %, a flame retardant rating of grade V-0 according the standard UL 94 was achieved. Advantageously, this is a lower loading than required with conventional flame retardants which typically require an overall loading of more than 20 wt %.

In a fourth aspect, there is provided a moulded article comprising the flame retardant polyolefin formulation as described above. Embodiments and advantages described for the flame retardant polyolefin formulation of the third aspect can be analogously valid for the moulded article of the fourth aspect, and vice versa. As the various embodiments and advantages have already been described above and in the examples demonstrated herein, they shall not be iterated for brevity where possible.

By "about" in relation to a given numerical value, such as for temperature and period of time, it is meant to include numerical values within 10% of the specified value.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

EXAMPLES

Key features of this application include two synergists (synergist 1 (Sng1) and synergist 2 (Sng2)) with unique chemical structures that are capable of providing good flame retardant performance to a polyolefin matrix. The two synergists, due to their polymeric nature, offer thermal stability and structural integrity, and contain chemically linked DOPO moieties with cyclic organophosphorus and diphenyl structure that provide thermal stability and oxidation resistance. Sng1 contains a triazine derivative. Sng2 contains a spirocyclic pentaerythritol bisphosphorate derivative. The synthesis methods designed to produce the two chemical structures are also provided. The synthesis method for Sng1 involves the chemical reaction between chloride and phosphine derivative/secondary amine. A synthesis method for Sng2 involves the chemical reaction between chloride and hydroxyl groups, and that between a ketone and a phosphine derivative. The flame retardant polyolefin formulations that comprise Sng1 and Sng2 and a base flame retardant agent, ammonium polyphosphate (APP), with optimized ratio and overall loading can enhance the flame retardant properties of polyolefins. For example, a ratio of Sng1 or Sng2 to APP ranging from ⅓ to ¼ offers enhanced flame retardant properties. A loading of blend of Sng1 or Sng2 and APP of a minimum of only 18 wt % offers enhanced flame retardant properties, while conventional flame retardant polyolefin formulations typically require an overall loading of more than 20 wt %.

The flame retardant properties of the disclosed flame retardant polyolefin formulations were measured based on UL 94 standards, which is a plastics flammability standard released by the Underwriters Laboratories (USA). The standard classifies plastics according to how they burn in various orientations and part thicknesses from the lowest flame-retardant to most flame-retardant in six different classifications. The flame retardant properties measured for the flame retardant polyolefin formulations of this application reached UL V-0 grade, indicating that burning stops within 10 seconds on a vertical part allowing for drops of plastic that are not in flames.

Example 1: Synergists Synthesis

Two synergists, as displayed in Table 1, were designed and synthesized, aiming for improving the flame retardant performance of a polypropylene (PP) matrix.

TABLE 1

The chemical structures of the developed synergists

| Synergist code | Designed structure |
|---|---|
| Sng1 | 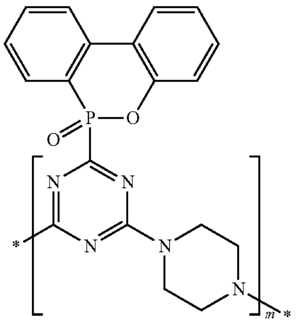 |
| Sng2 | 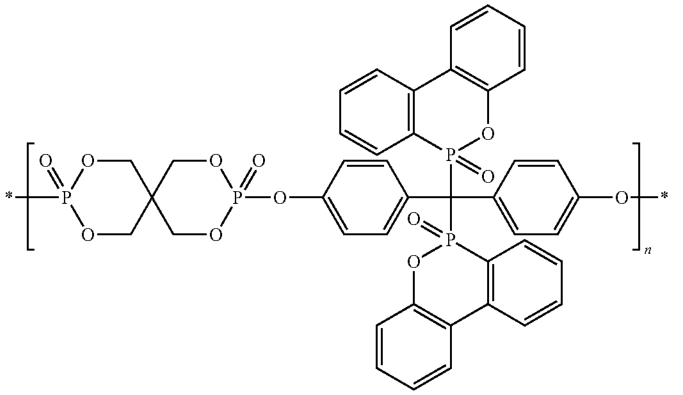 |

The synthesis strategy of Sng1 was schematically demonstrated in FIG. 1. Two steps are involved in this one-pot procedure. Briefly, 18.4 g cyanuric chloride (CC, 0.1 mol) and 21.6 g DOPO (0.1 mol) was firstly dissolved in about 230 g and 250 g anhydrous dioxane, respectively. Under flowing argon protection, magnetic stirring at 500 rpm and temperature of 12° C., DOPO/dioxane solution was added dropwise into CC/dioxane solution in the presence of 6.9 g $K_2CO_3$ powder over addition time of 2 hours (hrs). The reaction was then kept at 12° C. for 24 hrs before it was heated up to 80° C. and further kept at 80° C. for 6 hrs. In the next step, 5.3 g piperazine (PPZ, 0.1 mol) was dissolved in 100 g anhydrous dioxane and added dropwise into above solution over a period of 20 mins (argon protection, room temperature (RT) and stirring at 500 rpm) in the presence of 13.8 g fresh $K_2CO_3$ powder. The reaction was kept at RT for 24 hrs, further heated up to 80° C. and kept at 80° C. for 10 hrs. Using a centrifuge, the precipitate was obtained, washed by fresh dioxane three times followed by deionized (DI) $H_2O$ three times, and dried.

Figure 2:
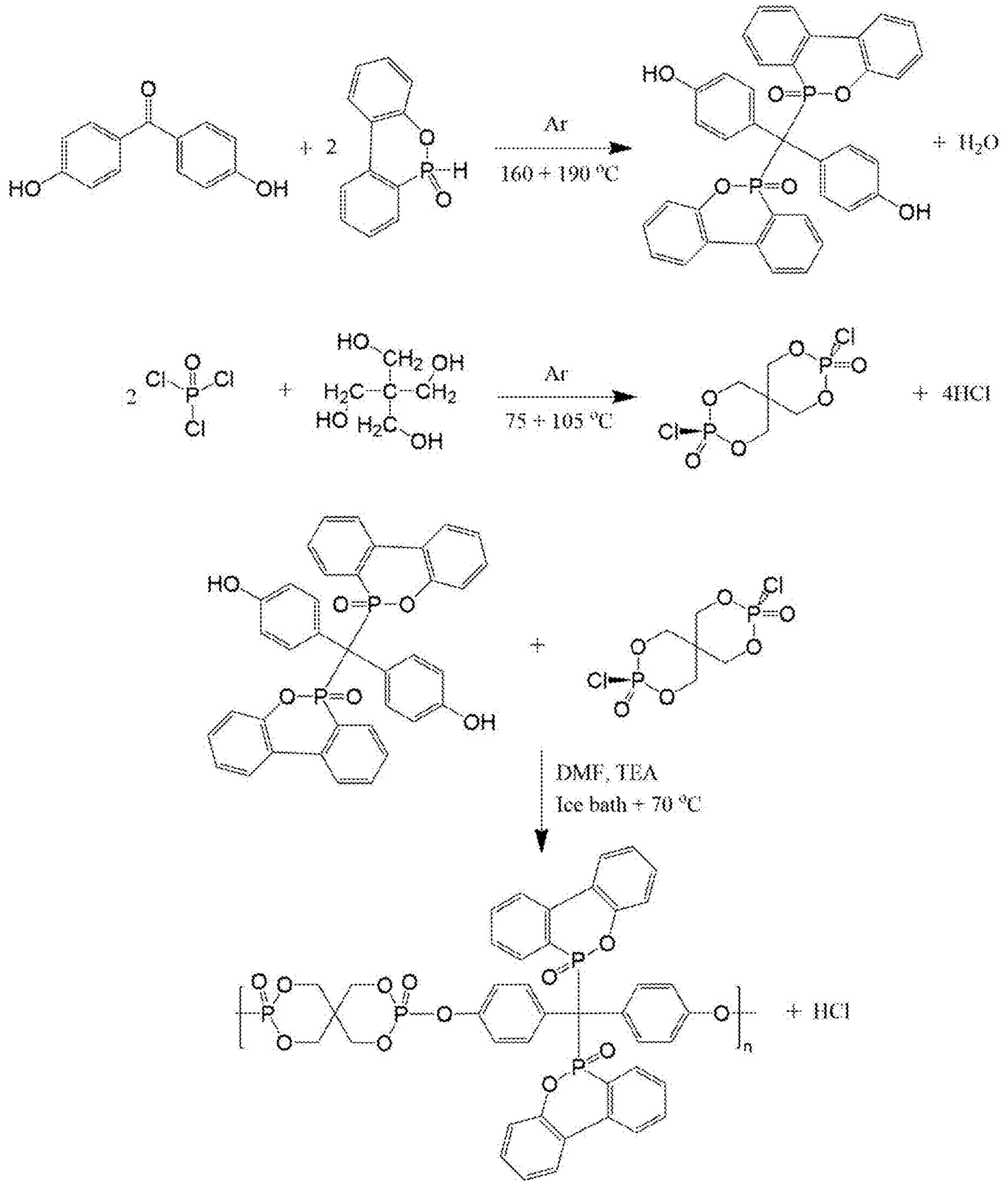
FIG. 2 shows the synthesis strategy of synergist 2 (Sng2)

The synthesis strategy of Sng2 was schematically demonstrated in FIG. 2. Multiple steps were involved in this strategy. Firstly, 43.2 g DOPO (0.2 mol) and 21.4 g 4,4-dihydroxy-benzophenone (DHBP, 0.1 mol) were mixed together in a round-bottomed flask under nitrogen protection. The mixture was heated to 160° C. and kept at 160° C. for 20 mins under stirring, and then further heated to 190° C. and kept at 190° C. for another 2 hrs. After cooling down to 100° C., 177.5 g tetrahydrofuran (THF, 200 mL) was added to the above solution, and the produced precipitate was immersed in THF overnight. The precipitate was filtered, washed by fresh THF three times and finally dried. The dried solid was termed as DOPO-PhOH.

On the other hand, 30.6 g phosphorus oxychloride (PPOC, 0.2 mol) and 13.6 g pentaerythritol (PATT, 0.1 mol) was added to a three-neck flask equipped with a reflux condenser under nitrogen protection. The temperature of the reaction mixture was raised to 75° C. and maintained for 6 hrs under stirring. Afterwards, the mixture was heated to 105° C. and maintained at that temperature for another 12 hrs. After cooling to RT, the white precipitant was filtered, washed several times with trichloromethane and diethyl ether and finally dried to yield white powder product which was termed as SPDPC.

In the final step, 62.8 g DOPO-PhOH and 29.7 g SPDPC was dissolved in 850 g N, N-dimethylformamide (DMF, 900 mL) under stirring at 70° C. The solution was cooled down using an ice-bath. 24.2 g trimethylamine (TEA, 33.3 mL) was added dropwise to the mixture under stirring. The reaction mixture was heated to 70° C. and maintained at 70° C. for 24 hrs before it was finally poured into 10 times volume of an NaCl aqueous solution diluted with ice. The light yellow precipitate was then collected by centrifuge (6000 rpm for 10 mins) followed by filtration. After washing with DI $H_2O$ three times, the light yellow product was dried and collected.

Example 2: Compounding and Coupon Fabrication

Polypropylene (PP) copolymer (P640J, SCG Chemicals, Thailand) blended with maleated PP (MAPP, Polybond 3002) in a ratio of 95/5 (w/w) was used as PP/MAPP matrix to verify the flame retardant performance of the synthesized synergists, and melamine-coated ammonium polyphosphate (APP-0M, Sanwafr, China) was used as base flame retardant agent for PP. The synergist was firstly mixed with APP-0M under various ratios (0/1, 1/1, 1/2, 1/3 and 1/4 for synergist/APP-0M in w/w) through ball milling (200 rpm, 2 hrs). The synergist/APP-0M mixtures were then blended with PP/MAPP mixed pellets using a twin-screw extruder (Haake, ThermoScientific). The maximum extrusion temperature and screw speed is 200° C. and 150 rpm, respectively. The obtained synergist/APP-0M/PP composites with various synergist/APP-0M loadings were further pelletized into corresponding pellet composites, which were then moulded into composite coupons, i.e., UL 94 flame retardant bars, for properties investigation. The injection moulding processing temperature, mold temperature, injection pressure and post-pressure was set at 200° C., 60° C., 600 bar and 300 bar, respectively.

Example 3: Characterization and Properties Investigation

The chemical composition and structure of the synergists was studied using an FTIR spectroscope (Shimadzu) and an NMR spectrometer (Bruker DRX 400 MHz). The flame retardant properties of the composites were investigated based on UL 94 standards. For the UL 94 test, the specimen thickness of 3.2 mm was chosen, and the time that required for the flame to extinguish after removing the burner was recorded to differentiate the flame retardant performance of one another.

Example 4: Synthesis and Characterization of the Synergists

Figure 3:
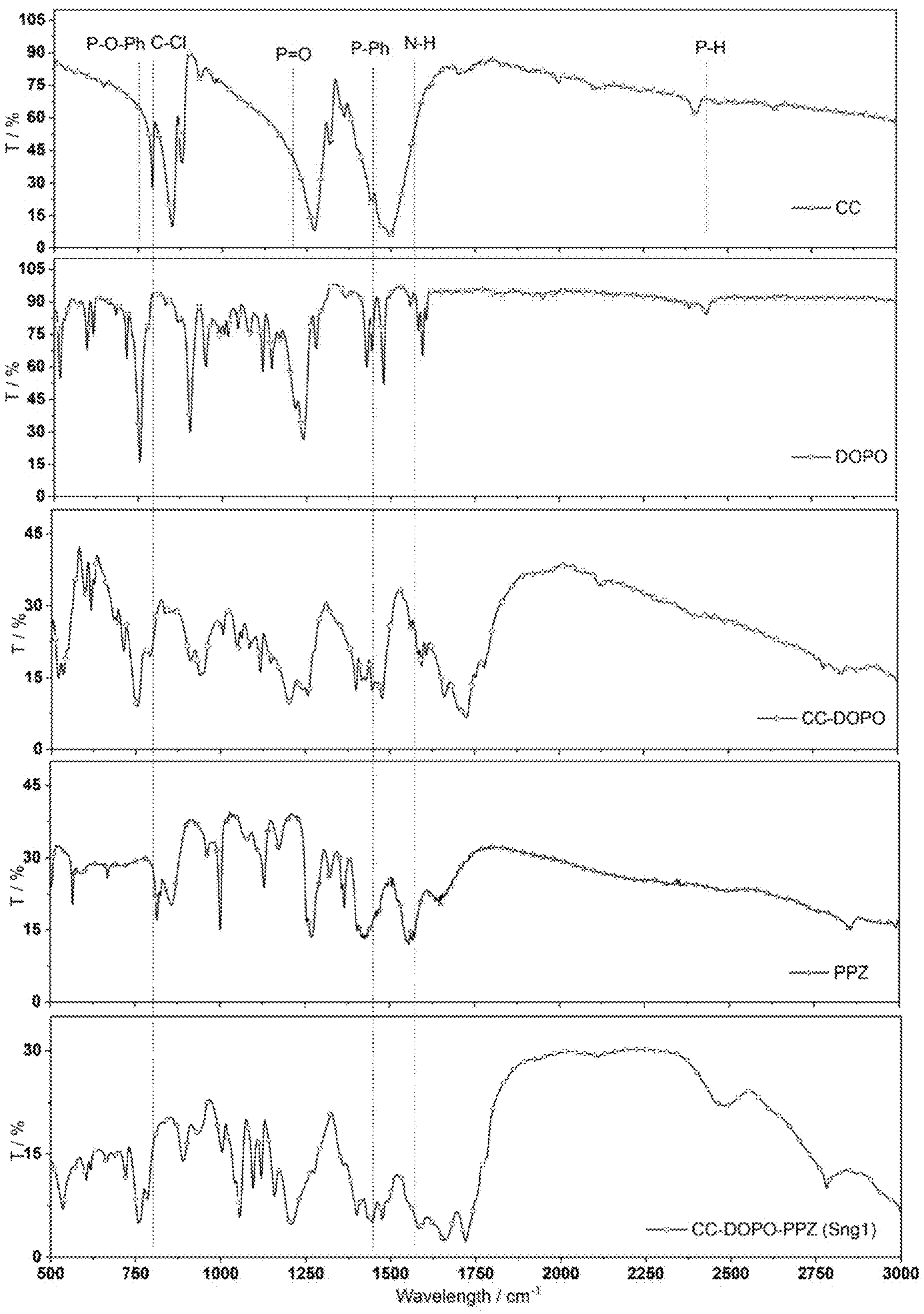
FIG. 3 shows the Fourier transform infrared (FTIR) spectra of the starting materials and the product after each step for Sng1.

Synergist 1. To synthesize Sng1, CC firstly reacted with DOPO with molar ratio of 1/1 under temperature of 12° C. and argon protection. The relatively low reaction temperature activated only one of the three C—Cl bonds on each CC molecule, saving the other two C—Cl bonds for the second reaction step involving PPZ. The dropwise addition of DOPO into CC solution maximized the conversion, leading to CC-DOPO (product of step 1) yield of more than 98%. As shown in the FTIR spectrum in FIG. 3, compared with original DOPO which has a characteristic peak at about 2437 $cm^{-1}$ due to the P—H bonds, the product after the 1st step (CC-DOPO) showed no peak at the same wavelength, indicating the occurrence of the reaction through P—H bonds and C—Cl bonds as presented in FIG. 1. The existence of P—O-Ph at about 755 $cm^{-1}$ (from DOPO), C—Cl at about 790 $cm^{-1}$ (from CC), P═O (from DOPO) at about 1210 $cm^{-1}$ and P-Ph (from DOPO) at about 1440 $cm^{-1}$ in CC-DOPO further confirmed the designed structure of CC-DOPO and the partial consumption of the C—Cl bonds. In the next step, the reaction occurred through left C—Cl bonds from CC-DOPO and N—H bonds from PPZ, leading to CC-DOPO-PPZ (Sng1) yield of about 50%. The disappearance of the characteristic peak of N—H bonds (about 1571 $cm^{-1}$) and C—Cl bonds (about 790 $cm^{-1}$) in Sng1 confirmed the successful reaction. In both steps, the detection of the gaseous HCl by pH indicator, which did not dissolve in dioxane and was released along with the flowing argon, further confirmed the occurrence of the reactions.

Figure 4A:
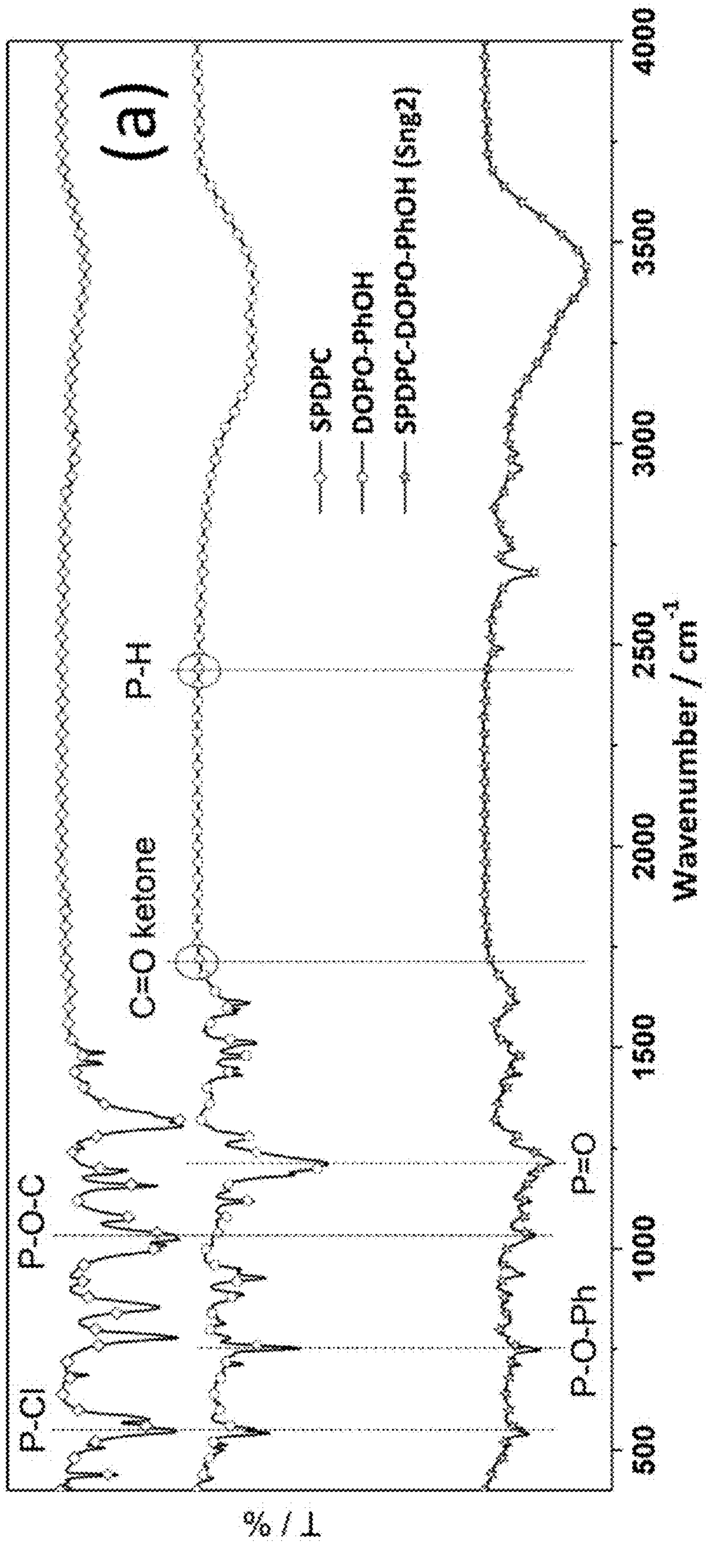
FIG. 4A shows the FTIR spectra of intermediate agents and Sng2.
Figure 4B:
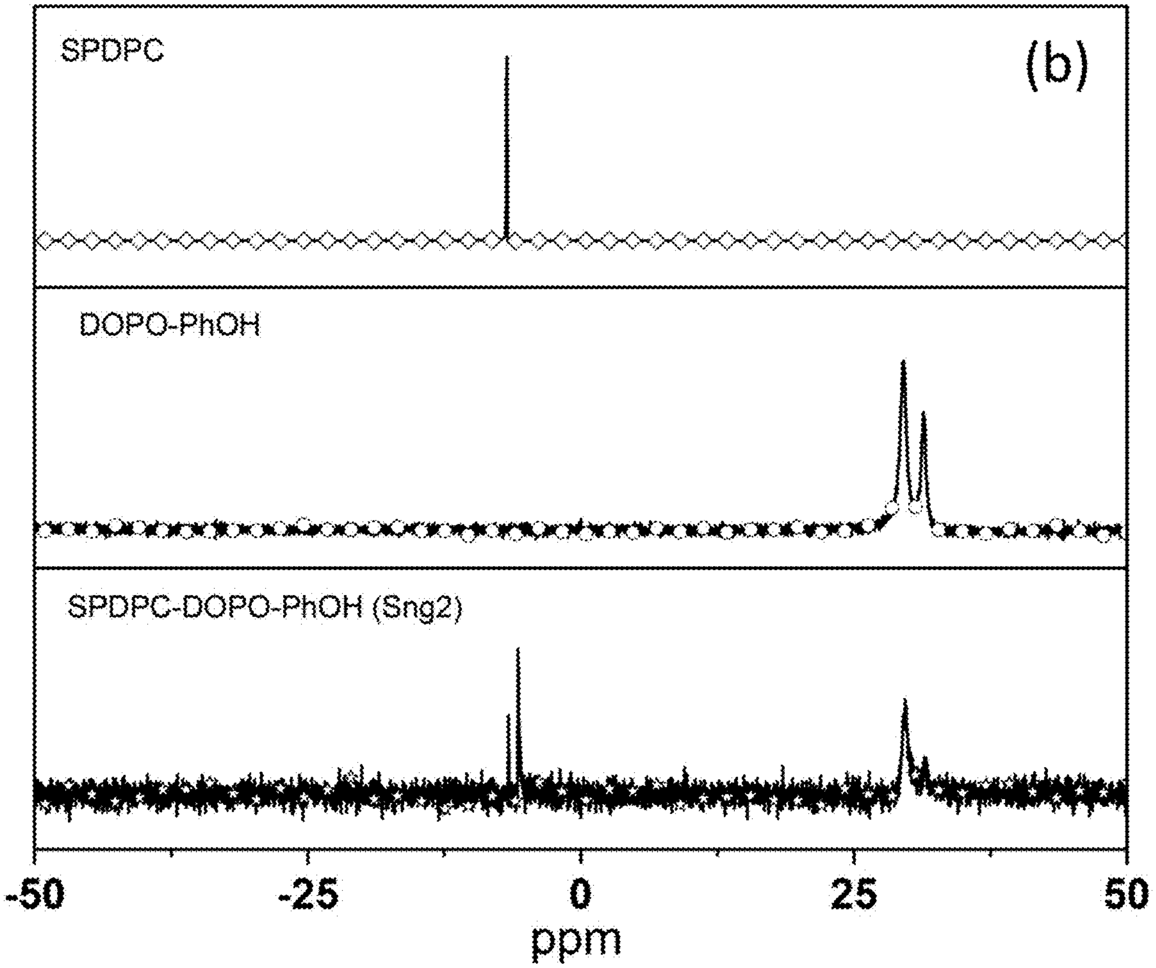
FIG. 4B shows the $^{31}P$ (nuclear magnetic resonance) NMR spectra of intermediate agents and Sng2.

Synergist 2. DOPO firstly reacted with DHBP through the P—H bonds from DOPO and C═O bonds from DHBP. As shown in the FTIR spectra (FIG. 4A), the detection of P—O-Ph and P═O peaks at 755 and 1210 $cm^{-1}$, respectively, and the disappearance of P—H peak (2437 $cm^{-1}$) and C═O peak (about 1710 $cm^{-1}$) confirmed the successful reaction. Upon further reacting with SPDPC, which has characteristic peaks at 550 $cm^{-1}$ (P—Cl bond) and 1033 $cm^{-1}$ (P—O—C bond), the final synergist (Sng2) was obtained. The $^{31}P$ NMR spectra as shown in FIG. 4B further confirmed the "combination" of DOPO-PhOH and SPDPC in the final step.

Example 5: Illustrative Examples

APP-0M was used as base flame retardant agent and combined with the developed synergists for PP/MAPP matrix. Two factors were taken into consideration for properties investigation and optimization, the ratio of synergist to APP-0M and the overall loading of synergist and APP-0M. Four different ratios for synergist/APP-0M, 0/1, 1/1, 1/2, 1/3 and 1/4, and overall loading ranging from 16 wt % to 25 wt % was chosen. The flame retardant properties of Sng1 and Sng2 were presented in Table 2 and Table 3, in which the time that was needed for the flame to extinguish upon burner removal ($1^{st}$ burning) was recorded for comparison purpose.

Figure 5:
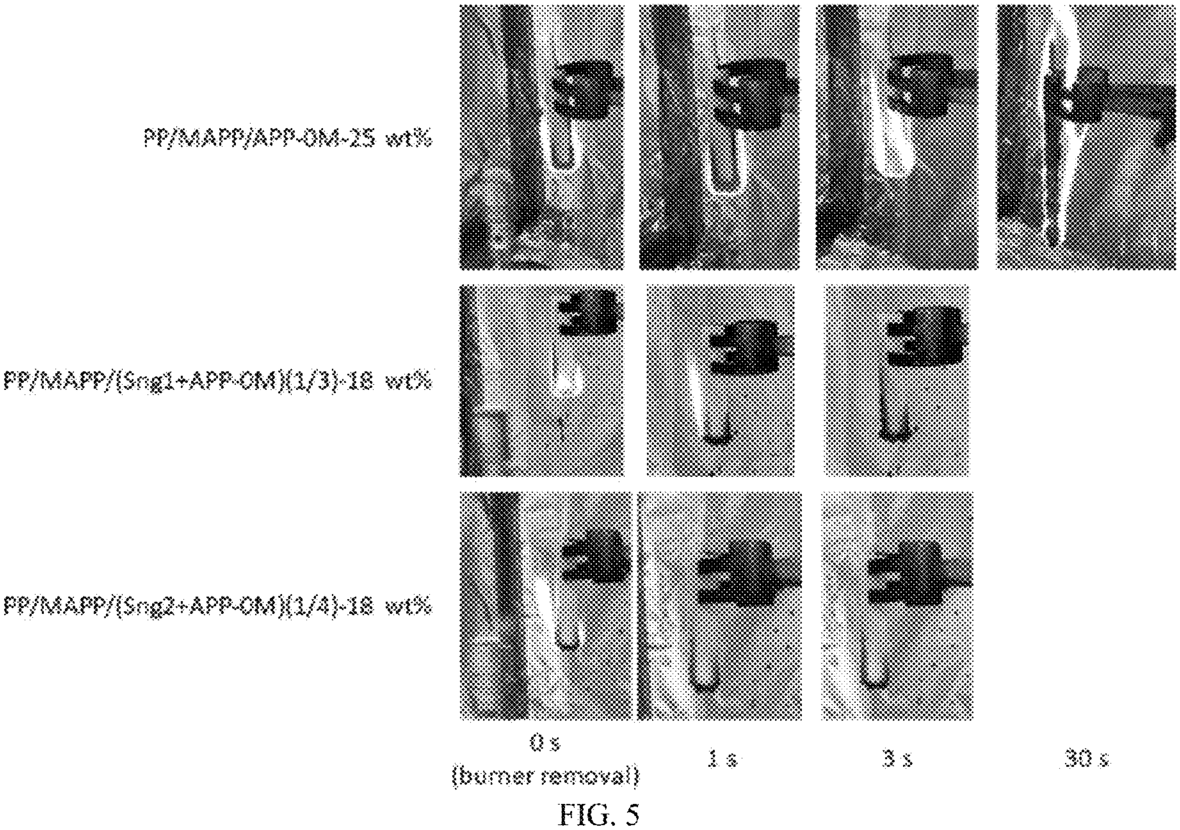
FIG. 5 shows the Underwriters Laboratories (UL) 94 test images of the optimized samples and the control sample.

Compared with those formulations blended with pure APP-0M, which are not rated (dripping) even at a loading of 25 wt %, the formulations of the present disclosure demonstrated improved flame retardant performance with the addition of Sng1. The formulations with the Sng1/APP-0M ratio of 1/3 in w/w showed the best performance among the tested ratios, in which a low overall loading of 18 wt % was used to achieve V-0 rate. A higher loading gave shorter extinguish time under the same ratio, leading to almost instant extinction (<1 s upon removal of burner) when the loading reaches 20 wt % and above. In the case of Sng2, the Sng2/APP-0M ratio of 1/4 leads to best flame retardant properties for the obtained composites, and an overall loading of 18 wt % is used to achieve V-0 rate. The UL 94 test images of the optimized samples and the control sample are presented in FIG. 5, which indicate the enhanced flame retardant properties of the optimized formulations.

TABLE 2

The flame retardant performance of Sng1 in PP/MAPP matrix

| Loading (wt %) | Sng1/APP-0M 0/1 (pure APP-0M) | 1/1 | 1/2 | 1/3 | 1/4 |
|---|---|---|---|---|---|
| 16 | — | — | — | Dripping | — |
| 18 | Dripping | Dripping | Dripping | V0/4 s | Dripping |
| 20 | — | — | — | V0/3 s | — |
| 22 | Dripping | V0/25 s | V0/3 s | V0/1 s | Dripping |
| 25 | Dripping | V0/3 s | V0/1 s | V0/<1 s | V0/6 s |

TABLE 3

The flame retardant performance of Sng2 in PP/MAPP matrix

| Loading (wt %) | Sng2/APP-0M 0/1 (pure APP-0M) | 1/1 | 1/2 | 1/3 | 1/4 |
|---|---|---|---|---|---|
| 16 | — | — | — | — | Dripping |
| 18 | Dripping | Dripping | Dripping | Dripping | V0/1 s |
| 20 | — | — | — | Dripping | — |
| 22 | Dripping | Dripping | Dripping | V0/1 s | V0/<1 s |
| 25 | Dripping | Dripping | Dripping | V0/1 s | V0/<1 s |

Example 6: Comparative Examples

When using a commercially available ammonium polyphosphate (APP)-based mixture as flame retardant agent, e.g., Exolit AP 766 (Clariant), a loading of 22 wt % is required to achieve V-0 rate under the same testing conditions. This also firmly verifies the efficiency of the two designed synergists Sng1 and Sng2.

The examples described above provide for halogen-free synergists, their synthesis methods and formulations for enhanced flame retardant polyolefins. Two synergists were synthesized with different starting agents and reaction routes. Binary flame retardant polyolefin formulations that comprise the developed synergists as synergist and a base flame retardant agent, ammonium polyphosphate (APP), were blended with polypropylene (PP) matrix under different synergist/APP ratios and loadings, and were further optimized to achieve the most efficient flame retardant performance. The produced PP/synergist/APP formulations showed excellent flame retardant properties and can achieve UL 94 "V-0 grade" when the flame retardant loading is as low as 18 wt %, whereas the commercial counterpart needs at least 22 wt %.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A flame retardant polyolefin composition comprising:
- a polyolefin matrix, a polymer, and an inorganic flame retardant,
- wherein the polymer is blended with the inorganic flame retardant in a weight ratio of 1:3 to 1:4,
- wherein the polymer has a backbone and a side unit of 9,10-dihydro-9-oxa-10-phosphaphenanthrene 10-oxide bonded thereto, wherein the backbone of the polymer comprises at least one heterocyclic moiety.

2. The flame retardant polyolefin composition of claim 1, wherein at least one heteroatom of the at least one heterocyclic moiety is selected from a group 15 element of the periodic table.

3. The flame retardant polyolefin composition of claim 2, wherein the polymer comprises at least 2 heteroatoms selected from the group 15 element of the periodic table in each repeating unit of the polymer.

4. The flame retardant polyolefin composition of claim 2, wherein the at least one heteroatom of the at least one heterocyclic moiety is nitrogen.

5. The flame retardant polyolefin composition of claim 2, wherein the at least one heteroatom of the at least one heterocyclic moiety is phosphorous.

6. The flame retardant polyolefin composition of claim 1, wherein the at least one heterocyclic moiety is selected from one or more of the group consisting of piperidinyl, pyridinyl, phosphaninyl, phosphininyl, diazinanyl, diazinyl, morpholinyl, oxazinyl, thiomorpholinyl, thiazinyl, triazinanyl, triazinyl, tetrazinyl, pentazinyl, cyclic 1,3-propanediol phosphoryl, and a combination thereof.

7. The flame retardant polyolefin composition of claim 6, wherein the diazinanyl is selected from the group consisting of 1,2-diazinanyl, 1,3-diazinanyl, 1,4-diazinanyl (piperazinyl), and a combination thereof.

8. The flame retardant polyolefin composition of claim 1, the polymer having the formula (I)

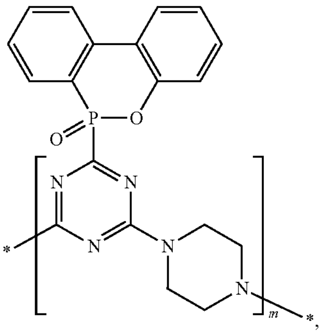

(I)

wherein m is an integer number ranging from 2 to 5000; and

* represents an attachment point.

9. The flame retardant polyolefin composition of claim 1, the polymer having the formula (II)

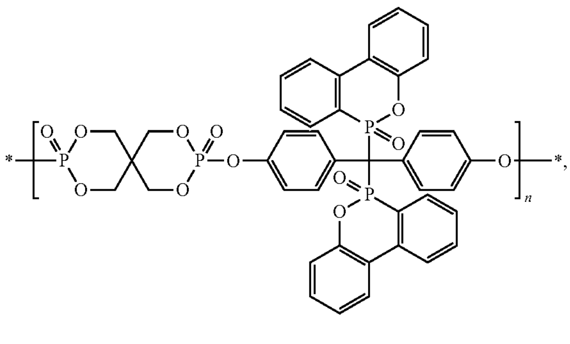

(II)

wherein n is an integer number ranging from 2 to 1000; and

* represents an attachment point.

10. A process for producing the flame retardant polyolefin composition of claim 1, comprising:

bonding 9,10-dihydro-9-oxa-10-phosphaphenanthrene 10-oxide to a monomeric unit to obtain a polymerisation precursor;

polymerizing the polymerisation precursor with at least one heterocyclic unit, wherein the backbone of the polymer is formed by the reaction product of the monomeric unit and the at least one heterocyclic unit;

obtaining the polymer of claim 1 by precipitation; and mixing the polymer with a polyolefin matrix and an inorganic flame retardant, wherein the polymer is mixed with the inorganic flame retardant in a weight ratio of 1:3 to 1:4.

11. The process of claim 10, wherein bonding 9,10-dihydro-9-oxa-10-phosphaphenanthrene 10-oxide to the monomeric unit comprises heating a mixture of two molecules of 9,10-dihydro-9-oxa-10-phosphaphenanthrene 10-oxide with a monomeric unit at a temperature of 160° C. to 190° C.

12. The process of claim 10, wherein the polymerisation precursor is obtained by precipitation.

13. The flame retardant polyolefin composition of claim 1, wherein the polyolefin matrix is present in a weight percentage range of 20 wt % to 90 wt %.

14. The flame retardant polyolefin composition of claim 1, wherein the polyolefin matrix further comprises polypropylene having an anhydride grafted thereon.

15. The flame retardant polyolefin composition of claim 1, wherein the inorganic flame retardant is coated with a nitrogen-containing heterocyclic compound.

16. The flame retardant polyolefin composition of claim 1, wherein the inorganic flame retardant is a polymeric salt.

17. The flame retardant polyolefin composition of claim 1, wherein the inorganic flame retardant together with the polymer of claim 1 is present in the flame retardant polyolefin composition in 18 wt % to 21 wt %, based on the total weight of the flame retardant polyolefin composition.

18. A moulded article comprising the flame retardant polyolefin composition of claim 1.

* * * * *